Daniel Fitzgerald's interposed steel & iron lining for Safes.
No. 121,503.  Patented Dec. 5, 1871.
Fig. 1 — Horizontal Section.
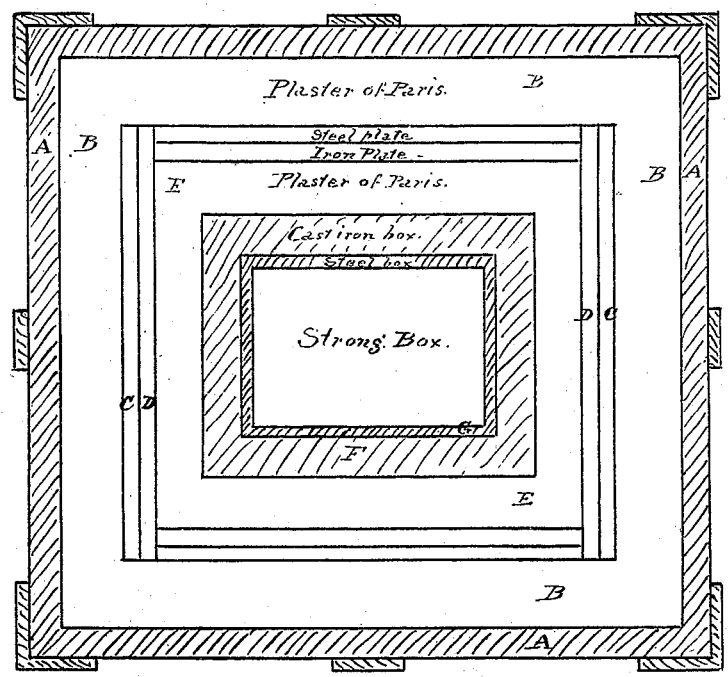
Fig. 2 — Vertical Section.
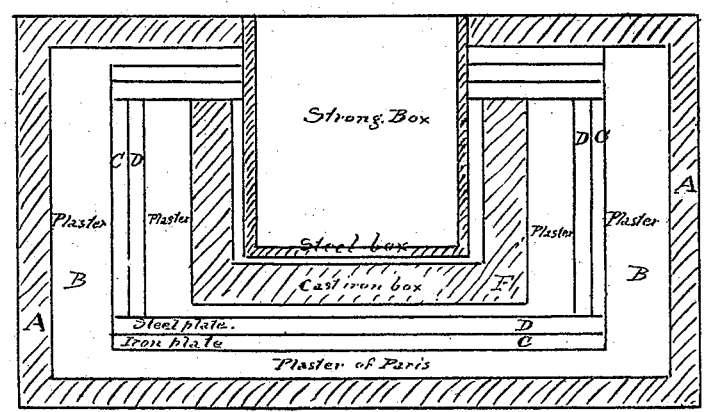
Witness.
Owen G. Warren
J. D. Sturtevant
Daniel Fitzgerald 121,503

UNITED STATES PATENT OFFICE.

DANIEL FITZGERALD, OF NEW YORK, N. Y.

IMPROVEMENT IN SAFES.

Specification forming part of Letters Patent No. 121,503, dated December 5, 1871.

*To all whom it may concern:*

Be it known that I, DANIEL FITZGERALD, of the city, county, and State of New York, have invented an Improvement in the Construction of Burglar-Proof Safes, of which the following is a specification:

The nature of my invention consists in the combination, with an inner strong box of steel and iron, of a suitable outer shell and a filling, such as hereindescribed, of interposed compound plates of welded steel and iron, protected on both sides by the said filling, whereby the contents of the safe are rendered more difficult of access and the compound plates protected against the operation of sledges or drills.

Figure 1 is a section, showing the position of the steel and iron plates in the walls of a safe; Fig. 2, section, further showing the relative position of the interposed plates.

A, the outside of the safe; B, the filling, which may be of plaster of Paris or any substance of similar nature; C and D, the welded steel and iron plates inclosing all the interior; E, the second filling; F, cast-iron box; G, an interior steel box, the door to which should have the same general construction as described for the body of the safe.

As it is often the case that hardened steel plates, in the construction of safes, are softened by the burglar's blow-pipe, and the metal cut out or broken without softening, I have planned to weld together iron and steel plates, making a compound plate, the iron whereof protects the hardened steel from fracture by the blows of a sledge, and the steel gives infrangibility and resistance to the drill; and I place them within the body or walls, to be inaccessible to the burglar, and surrounded within and without by plaster, or like substance to prevent being heated or softened. Though the burglar may cut through to the plates he cannot well heat them because of the plaster on the inner side.

The advantage of the use of plaster of Paris is, that it is not merely a non-conductor as that term is applied to wood and other substances, but is a heat-repeller, the peculiarity of its action being that while normally dry, when acted on by heat it becomes moist, and continues to give off moisture for an indefinite time during the application of the heat.

To add still more to the safety of the box I put an interior box of steel, G, within a cast-iron box, F; and, for a still further protection from conflagration, put in filling E.

Any door or plug for this safe should be of the same construction.

I am aware that plates of welded steel and iron have been used in the making of safes; but not, as I believe, protected from the action of heat by being interposed between stratums of plaster or like substance, as above set forth.

I claim as my invention—

The combination, with the inner strong box F, the outer shell A, and the filling described, of the interposed compound plate of welded steel and iron, protected within and without by said filling, for the purposes and substantially as set forth.

DANIEL FITZGERALD.

Witnesses:
OWEN G. WARREN,
J. D. STURTEVANT.

(70)